(12) United States Patent
Goma et al.

(10) Patent No.: US 7,692,830 B2
(45) Date of Patent: Apr. 6, 2010

(54) LUMINANCE NONUNIFORMITY ADJUSTMENT METHOD AND LUMINANCE NONUNIFORMITY ADJUSTMENT MODULE USING THIS METHOD

(75) Inventors: Tatsuji Goma, Wakayama (JP); Yoshiyuki Nakatani, Wakayama (JP); Takeshi Nishihara, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 1015 days.

(21) Appl. No.: 11/411,269

(22) Filed: Apr. 26, 2006

(65) Prior Publication Data

US 2007/0097462 A1      May 3, 2007

(30) Foreign Application Priority Data

Apr. 26, 2005   (JP)   .............................. 2005-127888

(51) Int. Cl.
   *H04N 1/46*   (2006.01)
(52) U.S. Cl. .......................... 358/504; 358/1.9; 358/2.1; 358/515; 358/517; 358/518; 358/1.7; 358/519; 358/521
(58) Field of Classification Search .................. 358/1.9, 358/2.1, 515, 517, 518, 504, 1.7, 519, 521
   See application file for complete search history.

(56) References Cited

U.S. PATENT DOCUMENTS 5,856,876 A * 1/1999 Sasanuma et al. ........... 358/300

FOREIGN PATENT DOCUMENTS

| JP | 2001-138565 | 5/2001 |
|----|-------------|--------|
| JP | 2001133913 A * | 5/2001 |
| JP | 2005-064801 | 3/2005 |
| JP | 2005-73047 | 3/2005 |
| JP | 2005073047 A * | 3/2005 |

* cited by examiner

*Primary Examiner*—King Y Poon
*Assistant Examiner*—Quang N Vo
(74) *Attorney, Agent, or Firm*—Fulbright & Jaworski LLP

(57) ABSTRACT

A luminance nonuniformity adjustment module for eliminating luminance nonuniformities in light emitting elements determines a luminance correction coefficient for each light-emitting element through a test print. The luminance nonuniformity adjustment module comprises a provisional luminance correction coefficient calculation unit, an improper coloring degree calculation unit and a luminance correction coefficient determination unit. The provisional luminance correction coefficient calculation unit calculates a provisional luminance correction coefficient by comparing a measured density value for a grayscale chart and a predetermined target density value. The improper coloring degree calculation unit calculates an improper coloring degree, which is the degree of improper coloring that occurs when other colors are expressed when developing a specific color, from the measured density values for the grayscale chart and an unbalanced chart in which the gray balance has been altered. The luminance correction coefficient determination unit corrects the provisional luminance correction coefficient using the improper coloring degree.

9 Claims, 6 Drawing Sheets

LUMINANCE NONUNIFORMITY ADJUSTMENT METHOD AND LUMINANCE NONUNIFORMITY ADJUSTMENT MODULE USING THIS METHOD

FIELD OF THE INVENTION

The present invention relates to luminance nonuniformity adjustment methods, and luminance nonuniformity adjustment modules using the same, which store on a correction table a luminance correction coefficient for each light-emitting element that has been found through a test print that uses a light-sensitive material, in order to eliminate luminance nonuniformities in the optical elements of a color laser print head that controls a plurality of light-emitting elements lined up in a linear array for each color of the three basic colors in accordance with the exposure gradation values based on the image data in order to expose the light-sensitive material.

DESCRIPTION OF THE RELATED ART

Digital laser printers that send drive signals based on image data to fluorescent light-emitting elements, which are employed as optical elements, lined up in a linear array to cause them to radiate light and by sensitizing a light-sensitive material to form images are known (for example, see JP 2001-138565A (paragraph numbers 002 to 0005)). In such digital laser printers, a gradation is generated by changing the ratio of the time that the fluorescent light-emitting elements emit/do not emit light during a unit time. It is necessary that the fluorescent light-emitting elements share a uniform luminance when supplied with the same exposure gradation value to obtain a good image. That is, it is necessary that the fluorescent light-emitting elements generate exposure dots having identical density values. Thus, to correct differences in the unique light-emission properties of each fluorescent light-emitting element (i.e., so-called luminance nonuniformities), test exposure dots are produced in a test print by supplying all of the fluorescent light-emitting elements with the same exposure gradation value. The luminance correction coefficients for correcting the exposure gradation values are calculated from the measured density values of the test exposure dots and stored in a correction table so that the density values of the exposure dots generated by the fluorescent light-emitting elements match one another. When an actual printing is performed, the exposure gradation values based on the image data that have been received are corrected using these luminance correction coefficients. The fluorescent light-emitting elements are then driven using the corrected exposure gradation values. The task of determining luminance correction values through a test print is called luminance nonuniformity adjustment (uniformity adjustment), and for example this task is performed each morning when the printer is powered up (daily setup) or each time the light-sensitive material that is used is changed (initial setup).

For the test print, luminance nonuniformity adjustment uses a color chart made of a test image for each color of the three basic colors (G, B, R or C, M, Y) used to create color images or a grayscale chart made of a test image that combines the three basic colors. Due to the importance of the gray balance in photographic prints, however, laser printers for producing photographic prints have mostly used a grayscale chart for the sake of the final image quality (for example, see JP 2005-64801A (paragraphs 0025 to 0026, FIG. 4)). However, to create a grayscale chart, the optical elements for each color of the three basic colors (G, B, R) irradiate a light beam onto the light-sensitive material in a uniform light amount, but since the wavelength-light amount properties of each color light beam and the spectral sensitivity characteristics of the light-sensitive material are arc-shaped, simply increasing or decreasing the amount of light of a specific color (for example, B: blue) light beam results in an increase or decrease in other color components (for example, G: green and R: red) as well and ultimately this causes an unintended increase/decrease in the density values of the other color components in the grayscale chart that is produced. This generation of unintended color components (in this case, G: green and R: red) is called improper coloring. In contrast, the generation of intended color components (in this case B: blue) can be called primary coloring. Thus, improper coloring can occur if density is measured with the grayscale chart to correct the light amount of the light-emitting elements, and therefore even if the light-emitting elements of each color are corrected based on the density values for each color that are obtained from the grayscale chart, the luminance nonuniformity correction is not sufficiently precise.

Instead of luminance nonuniformity adjustment, there has also been proposed a technique of, when correcting at the time of generating print discrepancies in the density of the image that is formed on the light-sensitive material data that are due to differences in the spectral sensitivity characteristics of the light-sensitive material, generating improper coloring curves for each color in advance, considering the effect of improper coloring, in which when exposure is performed to produce one of the three colored layers of cyan, magenta, and yellow, not only the one colored layer but also other colored layers are produced to a certain degree and correcting the light modulation data based on these improper coloring curves (for example, see JP 2005-73047A (paragraphs 0085 to 0087, FIG. 12)). However, this technology requires a time-consuming process of using a non-linear graph to calculate the improper coloring amount, and it is very difficult to introduce this technology into the luminance nonuniformity adjustment task due to the burden it places on the task.

SUMMARY OF THE INVENTION

The present invention overcomes the problems and shortcomings in the related art and it is an object thereof to provide a technology in the field of luminance nonuniformity adjustment which inhibits correction error due to improper coloring through a simple method.

In accordance with an embodiment of the present invention, a luminance nonuniformity adjustment method stores, on a correction table, a luminance correction coefficient for each optical element determined through a test print using a light-sensitive material. This eliminates the luminance non-uniformities in the optical elements of a color laser print head that controls a plurality of optical elements in a linear array for each color of the three basic colors, according to exposure gradation values based on image data, to expose the light-sensitive material. The present method comprises calculating a provisional luminance correction coefficient by comparing a measured density value for a grayscale chart of areas having different density values and a predetermined target density value. An improper coloring degree, which is the degree of improper coloring that occurs when other colors are expressed when developing a specific color is calculated from the measured density values for the grayscale chart and an unbalanced chart where the gray balance has been altered. The provisional luminance correction coefficient is the corrected using the calculated improper coloring degree to determine a final luminance correction coefficient.

In the present method, the measured density values corresponding to the grayscale chart and the unbalanced chart where the gray balance has been altered (for example, this is generated by changing only the B: blue gradation value from gray) to calculate the improper coloring degree. The improper coloring degree is the degree of unintentional production of a color other than a specific color (such as G: green or R: red) when only the specific color (for example, B: blue) has been changed. The provisional luminance correction coefficients that have been calculated through conventional luminance nonuniformity adjustment is then corrected, which does not consider improper coloring. The luminance correction coefficients, which are ultimately obtained, inhibit the negative effects due to improper coloring, thereby achieving luminance nonuniformity adjustment of is high precision.

Since it is necessary to measure the density of both the grayscale chart and the unbalanced chart with the luminance nonuniformity adjustment of the present invention, it is preferable that the grayscale chart and the unbalanced chart are formed on the same test print.

Further, the change in density of a specific color (for example, B: blue) in the light-sensitive material when only the gradation value of the specific color (for example, B: blue) has been changed differs depending on the characteristics of the light-emitting element and the light-sensitive material. Thus, in accordance with an embodiment of the present invention, a primary coloring degree, which is the degree of coloring of the specific color, is calculated from the measured density values for the grayscale chart and the unbalanced chart. The calculated primary coloring degree and the improper coloring degree are then used to correct the provisional luminance correction coefficient. That is, by considering the primary coloring degree in addition to the improper coloring degree, the luminance nonuniformity adjustment can be made with even higher precision. In accordance with an embodiment of the present invention, a method for correcting the provisional luminance correction coefficients calculates the final luminance correction coefficients by a matrix equation defined herein, which accounts for the improper coloring degree and the primary coloring degree. The matrix equation is defined as follows:

$$\begin{bmatrix} K\_B \\ K\_G \\ K\_R \end{bmatrix} = \begin{bmatrix} Bb & -Gb & -Rb \\ -Bg & Gg & -Rg \\ -Br & -Gr & Rr \end{bmatrix} \begin{bmatrix} a-1 \\ b-1 \\ c-1 \end{bmatrix} + \begin{bmatrix} 1 \\ 1 \\ 1 \end{bmatrix}$$

Here, K_B is the blue luminance correction coefficient, K_G is the green luminance correction coefficient, K_R is the red luminance correction coefficient, Bb is the primary coloring degree of blue with respect to the blue exposure gradation value, Gg is the primary coloring degree of green with respect to the green exposure gradation value, Rr is the primary coloring degree of red with respect to the red exposure gradation value, Gb is the improper coloring degree of blue with respect to the green exposure gradation value, Rb is the improper coloring degree of blue with respect to the red exposure gradation value, Bg is the improper coloring degree of green with respect to the blue exposure gradation value, Rg is the improper coloring degree of green with respect to the red exposure gradation value, Br is the improper coloring degree of red with respect to the blue exposure gradation value, Gr is the improper coloring degree of red with respect to the green exposure gradation value, "a" is the provisional luminance correction coefficient for blue, "b" is the provisional luminance correction coefficient for green and "c" is the provisional luminance correction coefficient for red.

Since the equation uses a simple matrix calculation, the final luminance correction coefficients can be determined using the calculated improper coloring degrees to correct the provisional luminance correction coefficients without the burden of heavy computation.

In accordance with an embodiment of the present invention, a luminance nonuniformity adjustment module (device) executes the luminance nonuniformity method described herein. The luminance nonuniformity adjustment module comprises a provisional luminance correction coefficient calculation unit, an improper coloring degree calculation unit and a luminance correction coefficient determination unit. The provisional luminance correction coefficient calculation unit calculates a provisional luminance correction coefficient by comparing a measured density value for a grayscale chart of areas having different density values and a predetermined target density value. The improper coloring degree calculation unit calculates an improper coloring degree, which is the degree of improper coloring that occurs when other colors are expressed when developing a specific color, from the measured density values corresponding to the grayscale chart and an unbalanced chart in which the gray balance has been altered. The luminance correction coefficient determination unit determines a final luminance correction coefficient by correcting the provisional luminance correction coefficient using the calculated improper coloring degree.

In accordance with an embodiment of the present invention, the luminance nonuniformity adjustment module additionally comprises a primary coloring degree calculation unit for calculating a primary coloring degree, which is a degree of coloring of a specific color, from the measured density value corresponding to the grayscale chart and the unbalanced chart. The luminance correction coefficient determination unit determines a final luminance correction coefficient from the provisional luminance correction coefficient using the primary coloring degree and the improper coloring degree.

It is appreciated that the luminance nonuniformity adjustment module can adopt the configurations for practicing the implementations as aforesaid and can similarly attain all of the effects of the luminance nonuniformity adjustment method described herein.

Various objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE PREFERRED EMBODIMENTS

Figure 1:
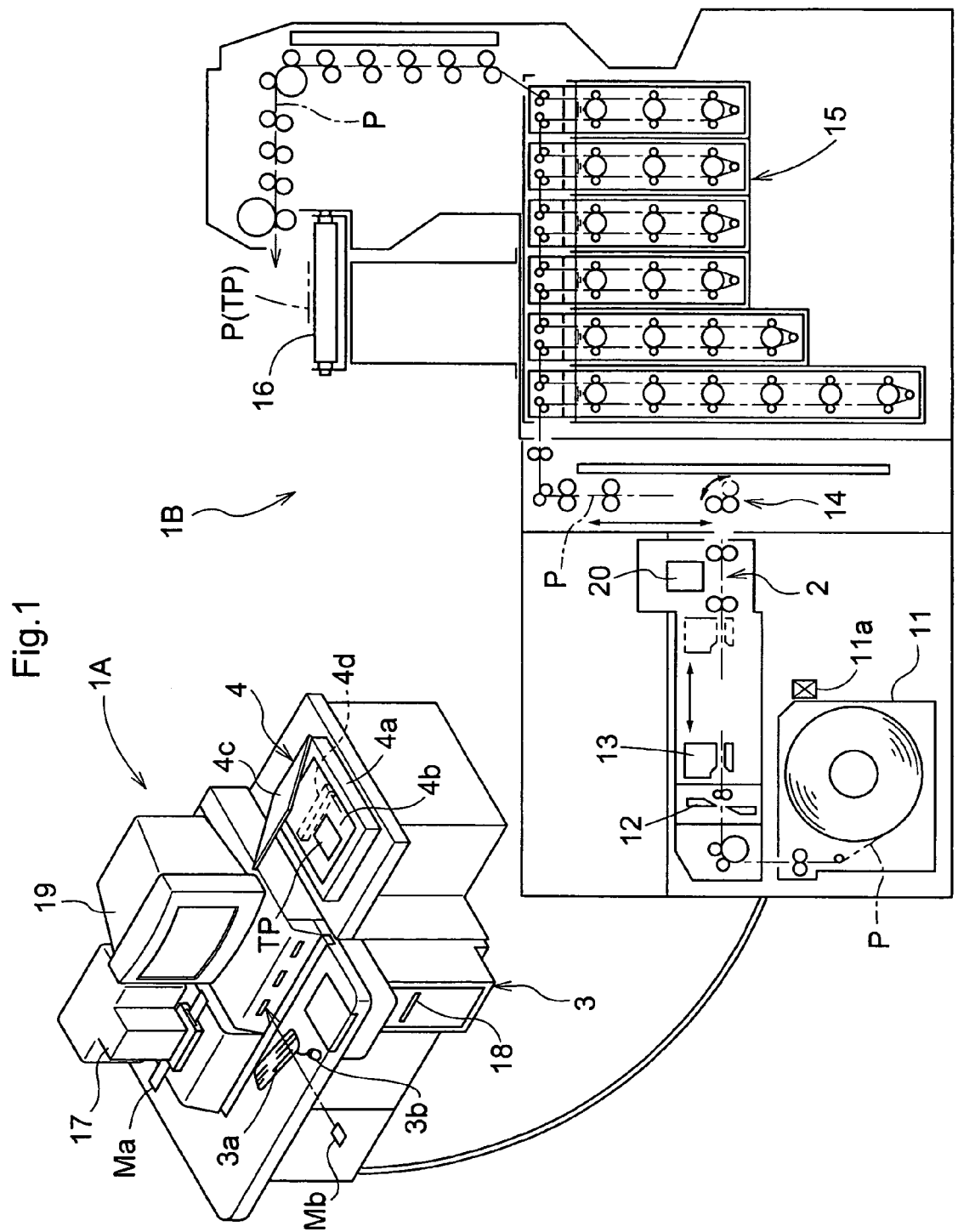
FIG. 1 is a schematic view of the external appearance of a digital laser printer that incorporates the luminance nonuniformity adjustment module in accordance with an embodiment of the present invention.

FIG. 1 shows a digital laser printer serving as an image forming device, which incorporates the luminance nonuniformity adjustment module in accordance with an embodiment of the present invention. The digital laser printer is also called a digital minilab. The digital laser printer comprises a print station 1B that exposes and develops print paper P, e.g., a light-sensitive material and an operation station 1A that performs appropriate image processing on the captured image data, which have been obtained from image recording media such as developed photographic film Ma or a digital camera memory card Mb and then transfers these to the print station 1B.

The print station 1B draws out roll-type print paper P that is stored in a print paper magazine 11, cuts the print paper P to the print size with a short cutter 12 and transports the cut print paper P horizontally with a paper-sandwiching type horizontal carrying mechanism 13 to an exposure unit 2. The horizontal carrying mechanism 13 carries the print paper P in the sub-scanning direction (horizontal carrying direction) while the capture image(s) is exposed on the surface of the print paper P by light radiated from a color laser print head 20 (hereinafter referred to as the "laser print head") in the exposure unit 2. After exposing the print paper P to the light radiation from the laser print head, the print paper P is flipped over by a vertical carrying device 14 and carried upward into a processing drum unit 15, which has a plurality of developing drums, and developed therein. After drying the developed print paper P, a horizontal conveyor 16 on an upper part of the print station 1B carries the print paper P to a sorter (not shown in the drawings), where the print paper P (i.e., photographic print) is sorted by customer order. A test print TP, which will be described herein, used for performing luminance nonuniformity adjustment (uniformity correction) for the laser print head 20 is produced in the same way as the photographic prints P, except that a test print TP a test image is exposed and formed in lieu of a captured image.

It should be noted that a mounting unit for mounting the print paper magazine 11 is provided with an ID code reader 11a for reading the print paper ID code assigned to the print paper magazine 11. The print paper ID code uniquely identifies the print paper P type and by recognizing the print paper ID code, the type of print paper P that is stored in the print paper magazine 11 can be known, that is, the type of print paper P that is used by the printer.

A film scanner 17 for obtaining image data from the captured image frames in the photographic film Ma is disposed in an upper portion of the desk-shaped console of the operation station 1A. A media reader 18 for obtaining captured images from, for example, CD-Rs or various types of memory cards used as a captured image recording medium Mb inserted into a digital camera or the like, is included as an external input device for a general personal computer that functions as a controller 3 of the digital laser printer. The controller 3 is connected to a monitor 19 for displaying various information.

A keyboard 3a and a mouse 3b are operational input devices for performing various settings and adjustments. Although not shown in the drawings, the controller 3 comprises USB and IEEE 1394 connection ports or interfaces for directly transferring image data from a digital camera, for example.

The controller 3 is also connected to an image reading device (e.g., a flatbed scanner 4) that functions as the density meter during luminance nonuniformity adjustment for the laser print head 20. The flatbed scanner 4 comprises a primary unit 4a comprising an original document platen 4b made of transparent glass or resin, an openable cover 4c that covers the original document platen 4b, and a scanner unit 4d that is capable of parallel movement within the primary unit 4a. The scanner unit 4d comprises a light source and a photoelectric transducer, such as a CCD, that extends in the main scanning direction and can move back and forth in the sub-scanning direction, which is perpendicular to the main scanning direction.

Figure 2:
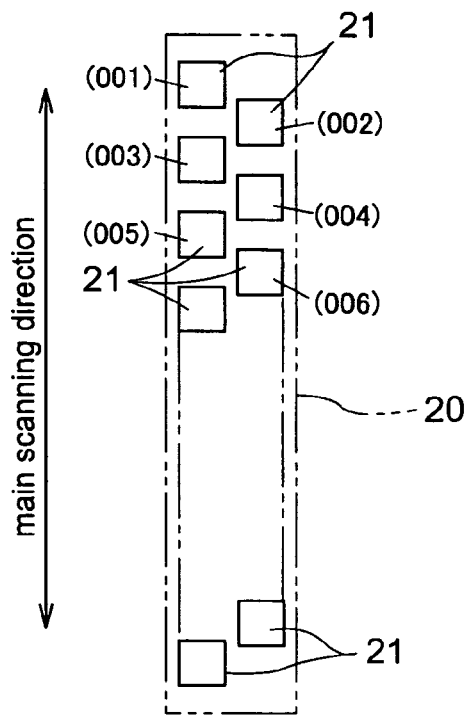
FIG. 2 is an explanatory diagram showing the arrangement of the light-emitting elements in the laser print head.

The laser print head 20 comprises three laser print head units, each emitting a light beam of the three basic colors R (red), G (green), and B (blue) downward. As schematically shown in FIG. 2, each laser print head is constituted by a linear array of a plurality of optical elements 21 lined up in the main scanning direction in a two-column staggered pattern. In accordance with an embodiment of the present invention, self-emitting type fluorescent light-emitting elements (hereinafter referred to as the "light-emitting element") 21 are used as the optical elements 21. The light beam emitted from the light-emitting elements 21 passes through a filter for R (red), G (green), or B (blue), yielding a light beam that corresponds to one of the three basic colors. The luminance of the light is emitted by the light-emitting elements 21 is controlled by adjusting the voltage that is applied to the electrodes corresponding to that light-emitting element. Of course, the laser print head 20 can be adopted or other laser print heads 20, such as liquid crystal shutter-type laser print heads that partially or completely uses LEDs in lieu of the fluorescent light-emitting elements as the light-emitting elements 21.

Figure 3:
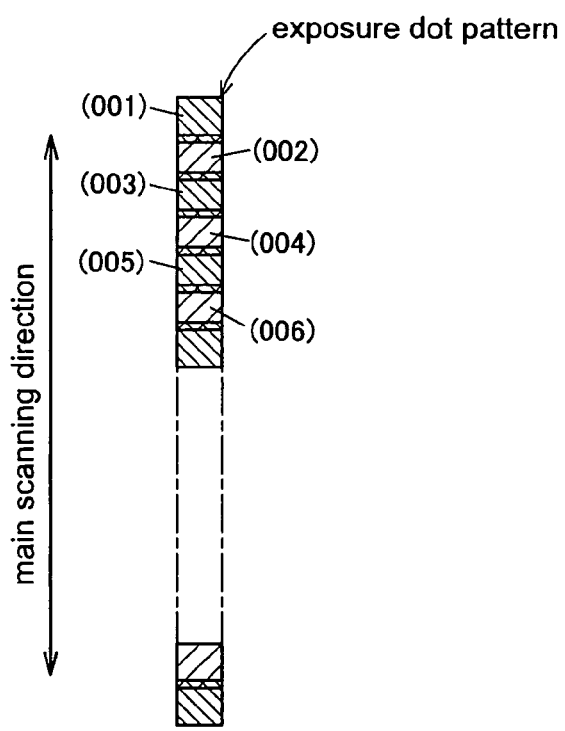
FIG. 3 is an explanatory diagram showing the linear exposure dot pattern produced by the laser print head.

Here, the light-emitting elements 21 in the linear array are divided into light-emitting elements 21 that have been assigned odd numbers and belong to the left column in FIG. 2, and light-emitting elements 21 that have been assigned even numbers and belong to the right column in FIG. 2. For example, to form one line in the main scanning direction on the print paper P using the light-emitting elements 21 in the left and right columns, exposure is performed by controlling when the light-emitting elements assigned an odd number and an even number emit light. The light-emitting elements are disposed as shown in FIG. 3, the dots that are formed by the light emitted from the light-emitting elements 21 that have been assigned an odd number (the exposure region denoted by odd numbers in parentheses) and the dots that are formed by the light emitted from the light-emitting elements 21 that have been assigned an even number (the exposure region denoted by even numbers in parentheses) slightly overlap in the main scanning direction.

During image exposure, the print paper P is moved in the sub-scanning direction relative to the light from the laser print head 20 or the light-emitting elements 21 that are arranged in the linear array in the main scanning direction. In synchronization with this relative movement, print control signals that correspond to the exposure gradation value of each RGB color based on the image data are sent to the laser print head 20 for each color. These cause the light-emitting elements 21 of the laser print head 20 to emit light only during a predetermined exposure time so as to form exposure dots having a predetermined density that corresponds to the light-emitting element 21 on the print paper P. As mentioned herein, the light-emitting elements 21 that have been given an odd number and the light-emitting elements 21 that have been given an even number radiate light at a timing that is staggered by a predetermined amount of time, so that the two staggered rows of light-emitting elements 21 expose the print paper P in lines at one exposure dot width. Full-color exposure dots are formed on the print paper P by performing control so that the exposure dots that are formed by the corresponding light-emitting elements 21 of the laser print head 20 of each color overlap. By exposing these color lines on the print paper P while moving the print paper P in the sub-scanning direction relative to the laser print heads 20, the entire latent image that corresponds to the image to be printed on the surface of the print paper P is formed.

The emission properties of the light-emission elements 21 must be adjusted using a correction amount that has been determined through luminance nonuniformity adjustment of the duration of the drive signals that are applied to the light-emission elements 21. In order to compensate for luminance nonuniformities (that is, the amount of light from each light-emitting element 21 is not the same even if they have been made to emit light based on the same exposure gradation value, and therefore the exposure dots have different densities) due to variation among the emission properties of the fluorescent bodies making up the light-emitting elements themselves, the emission area of the fluorescent bodies or the distance between electrodes. Further, since luminance non-uniformities also occur due to temporal fluctuations in emission properties, the luminance nonuniformity adjustment task is performed each morning when the machine is powered up, as well as each time that the type of print paper P that is used is changed, since there is a possibility that the exposure dots that are formed will have different densities when a different type of print paper P is used, even if the light amount is the same.

Figure 4:
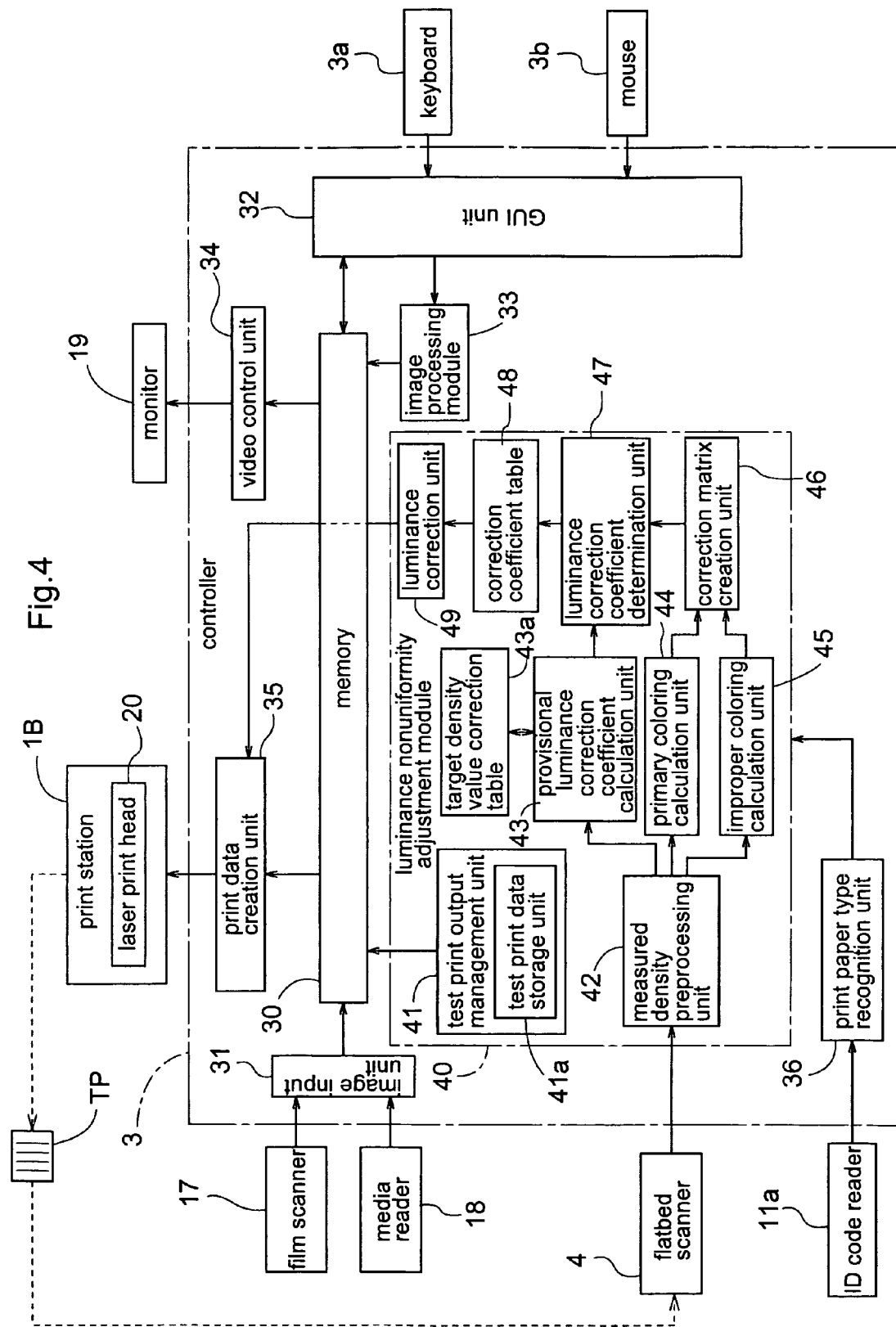
FIG. 4 is a functional block diagram for the controller of the digital laser printer of FIG. 1.

The controller 3 of the digital laser printer has a CPU as a central member that is constituted by functional units made of hardware or software, or both, for performing various types of processing in order to print photograph prints, such as various types of correction including gradation correction and color correction, and filter image processing such as border enhancement and shading. As shown in FIG. 4, examples of functional units that are particularly relevant to the present invention comprises an image input unit 31 that takes in image data that have been obtained by the film scanner 17 or the media reader 18 and transfers these to a memory 30 for subsequent processing. A luminance nonuniformity adjustment module 40 performs various types of processing for luminance nonuniformity adjustment based on the density data that are obtained using the flatbed scanner 4, which serves as a density meter, from the light and dark patches formed on the test print TP that has been output by the digital laser printer. A GUI unit 32 that constitutes a graphic user interface (hereinafter abbreviated as GUI) for generating graphic operation screens that include various windows and various operation buttons, for example and generating control commands from user input on such graphic operation screens (via a keyboard 3a or a pointing device such as a mouse 3b). An image processing module 33 performs various image processing on the image data in the memory 30. A video control unit 34 generates a video signal for displaying, on a monitor 19, the captured frame images based on the image data in the memory 30 or graphic data that have been sent from the GUI unit 32. A print data creation unit 35 generates print data that are suited for the laser print heads 20 provided in the exposure unit 2 of the print station 1B based on the processed image data. A print paper type recognition unit 36 identifies the type of the print paper stored in the print paper magazine 11 currently loaded from the print paper ID code that has been read by the ID code reader 11a.

The functions of the image processing module 33 are to perform fine color correction and filtering for trimming or attaining special effects on the image data in the memory 30 based on commands from the operator. Thus, the image processing module 33 comprises a prejudging unit that controls a prejudge task of specifying specific captured frame images and ordering correction, and an image processing unit that can perform various types of image processing. It is appreciated that in prejudge task can specify whether or not to print each of the captured frame images, the number of prints, and the print size. The image processing unit also comprises a function for generating simulated images of the expected print image to be displayed on the monitor 19 when performing the prejudge task.

The luminance nonuniformity adjustment module 40 comprises a test print output management unit 41, a measured density preprocessing unit 42, a provisional luminance correction coefficient calculation unit 43, a primary coloring degree calculation unit 44, an improper coloring degree calculation unit 45, a correction matrix creation unit 46, a luminance correction coefficient determination unit 47, a correction coefficient table 48 and a luminance correction unit 49. The test print output management unit 41 outputs, through the print station 1B, a test print TP forming at least a grayscale chart made of a plurality of areas (patches) having different density values and an unbalanced chart made of three patches in which the grayscale balance has been altered by increasing or decreasing a basic color (any one of G: green, B: blue, R: red) from the balanced grayscale. The measured density preprocessing unit 42 performs preprocessing on the measured density that has been sent from the flatbed scanner 4. The provisional luminance correction coefficient calculation unit 43 calculates a provisional luminance correction coefficient by comparing predetermined target density values are stored in a target density value table 43a and the measured density values of the grayscale chart that are obtained by the measured density preprocessing unit 42. The primary coloring degree calculation unit 44 calculates the primary coloring degree of each color from the measured density values for the grayscale chart and the unbalanced chart that are formed on the test print TP that has been output. The improper coloring degree calculation unit 45 calculates the improper coloring degree of each color from the measured density values for the grayscale chart and the unbalanced chart that are formed on the test print TP that has been output. The correction matrix creation unit 46 generates a correction matrix whose elements are the primary coloring degree calculated by the primary coloring degree calculation unit 44 and the improper coloring degree calculated by the improper coloring degree calculation unit 45. The luminance correction coefficient determination unit 47 corrects the provisional luminance correction coefficient using the correction matrix to find the final luminance correction coefficient. The correction coefficient table 48 stores the luminance correction coefficients eventually determined by the luminance correction coefficient determination unit 47. The luminance correction unit 49 uses a luminance correction coefficient that has been read from the correction coefficient table 48 to correct the exposure gradation value based on the image data when the print data creation unit 35 generates the print data to be given to the laser print head 20.

Figure 5:
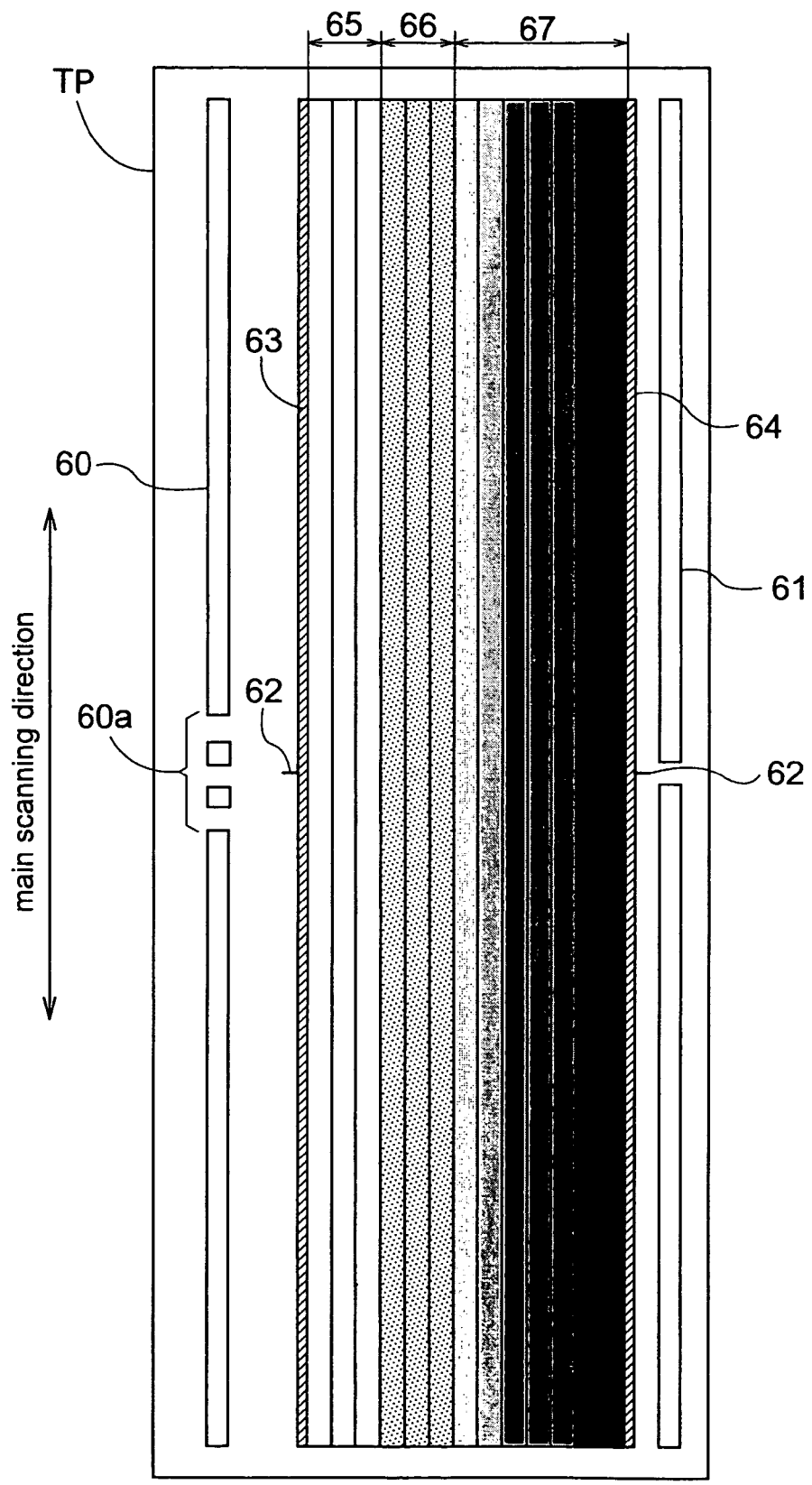
FIG. 5 is a plan view showing an example of the test print.

The test print output management unit 41 comprises a test print data storage unit 41a that stores image data for printing the test print TP forming at least the grayscale chart and the unbalanced chart. When performing luminance nonuniformity adjustment, the luminance of the image data for the test print read from the test print data storage unit 41*a* is corrected by the luminance correction unit 49 using the luminance correction coefficient that corresponds to the print paper that has been identified by the print paper type recognition unit 36. These data are converted to print data and then transferred from the print data creation unit 35 to the laser print head 20. FIG. 5 shows an example of a test print TP that has been output by the print station 1B in accordance with an embodiment of the present invention. The test print TP comprises a plurality of rows of thin, long exposure bars formed extending in the main scanning direction, which is the direction of the linear array of the light-emitting elements 21. The exposure bars comprises a start bar 60, which functions as an index that indicates the front end of the chart and a code pattern unit 60*a* that indicates the print paper type, an end bar 61 that indicates the rear end of the chart and a chart bar group that is disposed between the start bar 60 and the end bar 61. The ends of the chart bar group are made of an odd pixel line unit 63 made of exposure dots from only the light-emitting elements 21 that have been assigned odd numbers and an even pixel line unit 64 made of exposure dots from only the light-emitting elements 21 that have been assigned even numbers. A center indicator 62 is formed at a central position in the main scanning direction in each of these exposure dots. The primary region of the chart bar group is divided into a color chart region 65 made of patches of the basic colors, an unbalanced chart region 66 made of three improperly colored patches and a grayscale chart region 67 that is made of seven grayscale patches having different densities.

The three patches of the color chart region 65 are bar-shaped patches colored Y (yellow), M (magenta) and C (cyan), each made of an exposure dot group formed by independently irradiating the three light-emitting elements 21 for B (blue), G (green), and R (red). The three patches of the unbalanced chart region 66 are bar-shaped patches that are generated in sequence by changing only the gradation value of the light-emitting elements 21 of one color from among B (blue), G (green), and R (red) from the gradation value for producing an intermediate grayscale. The seven patches of the grayscale chart region 67 are bar-shaped patches produced in seven levels of gray from black (the light-emitting elements 21 of B, G, and R are set to their largest gradation value and irradiated to produce exposure dots whose B, G, and R 8-bit density values are substantially close to 0) to white (the light-emitting elements 21 of B, G, and R are set to their smallest gradation value and irradiated to produce exposure dots whose B, G, and R 8-bit density values are substantially close to 255). The luminance nonuniformity adjustment of the present invention principally uses the grayscale chart and the unbalanced chart.

The actual processing algorithm of the provisional luminance correction coefficient calculation unit 43, which calculates a provisional luminance correction coefficient by comparing the target density values and the measured density values of the grayscale chart obtained by the measured density preprocessing unit 42, is public knowledge, and for example, as recited in Patent Document (JP2005-64801A) that was introduced at the beginning of this specification are incorporated by reference in its entirety, the luminance correction coefficient found corrects the gradation values that are given to the light-emitting elements 21 so as to irradiate an amount of light with which the density value of the actual exposure dot matches the target density value. But this correction coefficient does not take into account improper coloring or changes in the primary coloring, and hence this is called the provisional luminance correction coefficient.

Figure 6:
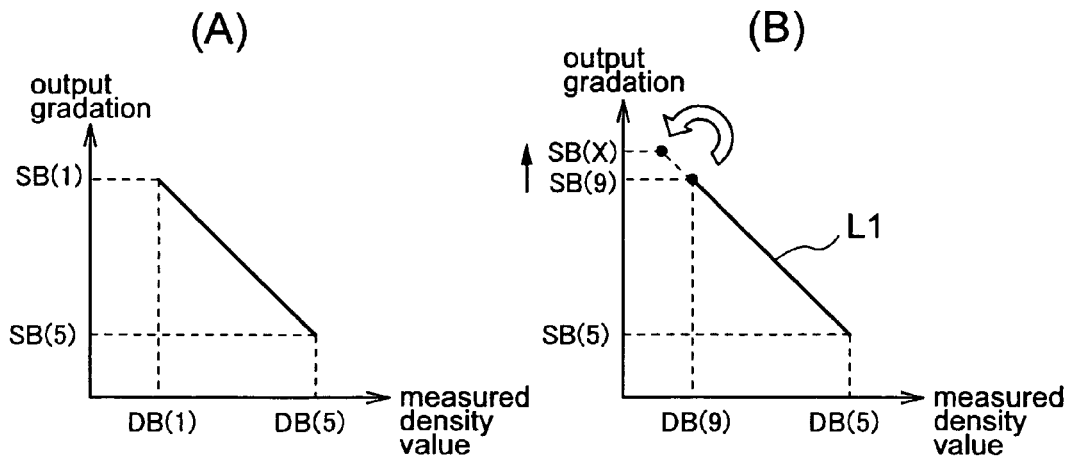
FIG. 6 is an explanatory diagram for describing how the primary coloring degree is calculated in accordance with an embodiment of the present invention.

The processing algorithm of the primary coloring degree calculation unit 44 of the present invention. In accordance with an embodiment of the present invention, the degree of change in the density value (or the measured density value) of a specific color in the gray exposure dots that accompanies the change in the gradation value (or the output gradation value) of the light-emitting elements 21 for that specific color among the three basic colors. In accordance with an embodiment of the present invention, the processing algorithm can be described schematically using a graph. FIG. 6A is a graph that shows the relationship between the output gradation and the measured density value for B: blue that is obtained using different patches in the grayscale chart. FIG. 6B is a graph that shows the relationship between the output gradation and the measured density value for B: blue that is obtained using a patch in the grayscale chart and a patch in the unbalanced chart.

The terms in the drawings are explained here together with those used in the following explanation. DB(*) is the measured density value for B: blue, DG(*) is the measured density value for G: green, and DR(*) is the measured density value for R: red. SB(*) is the gradation density value of the B: blue light-emitting element 21, SG(*) is the gradation density value of the G: green light-emitting element 21, and SR(*) is the gradation density value of the R: red light-emitting element 21. Here, the "*" is an indicator that specifies a patch in the grayscale chart and the unbalanced chart. For example, "0" indicates the patch showing black in the grayscale chart (the first grayscale patch), "1" indicates a patch showing a very dark gray in the grayscale chart (the second grayscale patch), and "5" indicates a patch showing a very light gray in the grayscale chart (the sixth grayscale patch). The numbers "7," "8," and "9" indicate the patches of the unbalanced chart, where "7" is the unbalanced patch formed when only the gradation value of the R: red light-emitting element 21 has been increased from the gray level (red improperly colored patch), "8" is the unbalanced patch formed when only the gradation value of the G: green light-emitting element 21 has been increased from the gray level (green improperly colored patch) and "9" is the unbalanced patch formed when only the gradation value of the B: blue light-emitting element 21 has been increased from the gray level (blue improperly colored patch).

FIG. 6A and FIG. 6B show the relationship between the output gradation and the measured density value for B: blue, and it can be understood from these that the line formula for the line L1 shown in FIG. 6B is used to find the correction factor: Bb (the change in the blue density when only the blue color amount has been changed) of the primary coloring degree from the ratio of the gradation value SB(1) for obtaining the measured density value DB(1) on the grayscale chart and the gradation value SB(x) for obtaining the same measured density value as DB(1) on the unbalanced chart. The slope of this line: $\alpha(B)$ is $$[SB(5)-SB(9)]/[DB(5)-DB(9)]$$

and the Y intercept: b[B] is $$SB(5)-DB(5)*\alpha(B).$$

Thus, the primary coloring degree correction factor: Bb for blue is expressed by the following equation. The same method was also used to express the primary coloring degree correction factor: Gg for green and the primary coloring degree correction factor: Rr for red in the below equations as well.

$$Bb = \frac{(a[B]*DB(1) + b[B])/SB(5)}{SB(1)/SB(5)}$$

$$Gg = \frac{(a[G]*DG(1) + b[G])/SG(5)}{SG(1)/SG(5)}$$

$$Rr = \frac{(a[R]*DR(1) + b[R])/SR(5)}{SR(1)/SR(5)}$$

Consequently, it is possible to generate the following correction matrix for the primary coloring.

$$\begin{bmatrix} Bb & 0 & 0 \\ 0 & Gg & 0 \\ 0 & 0 & Rr \end{bmatrix}$$

In accordance with an embodiment of the present invention, the processing algorithm of the improper coloring degree calculation unit 45 determines the degree of change in the density value of the other colors in the gray exposure dots that has accompanied the change in the gradation value of the light-emitting element 21 for a specific color of the three basic colors. The processing algorithm also can be described schematically using a graph. FIG. 7A is a graph that shows the relationship between the output gradation and the measured density value for B: blue that is obtained using different patches in the grayscale chart (it is identical to FIG. 6A, and shown here for the purpose of comparison), FIG. 7B is a graph that shows the change in the green measured density value when the B: blue gradation value that is obtained using a patch of the grayscale chart and a patch of the unbalanced chart is changed, FIG. 7C is a graph that shows the relationship between the output gradation relating to G: green that is obtained using different patches in the grayscale chart and the measured density value for G: green at that time and FIG. 7D is a graph that shows the relationship between the output gradation for G: green that is obtained using a patch on the grayscale chart and a patch on the unbalanced chart and the measured density value for G: green.

Figure 7:
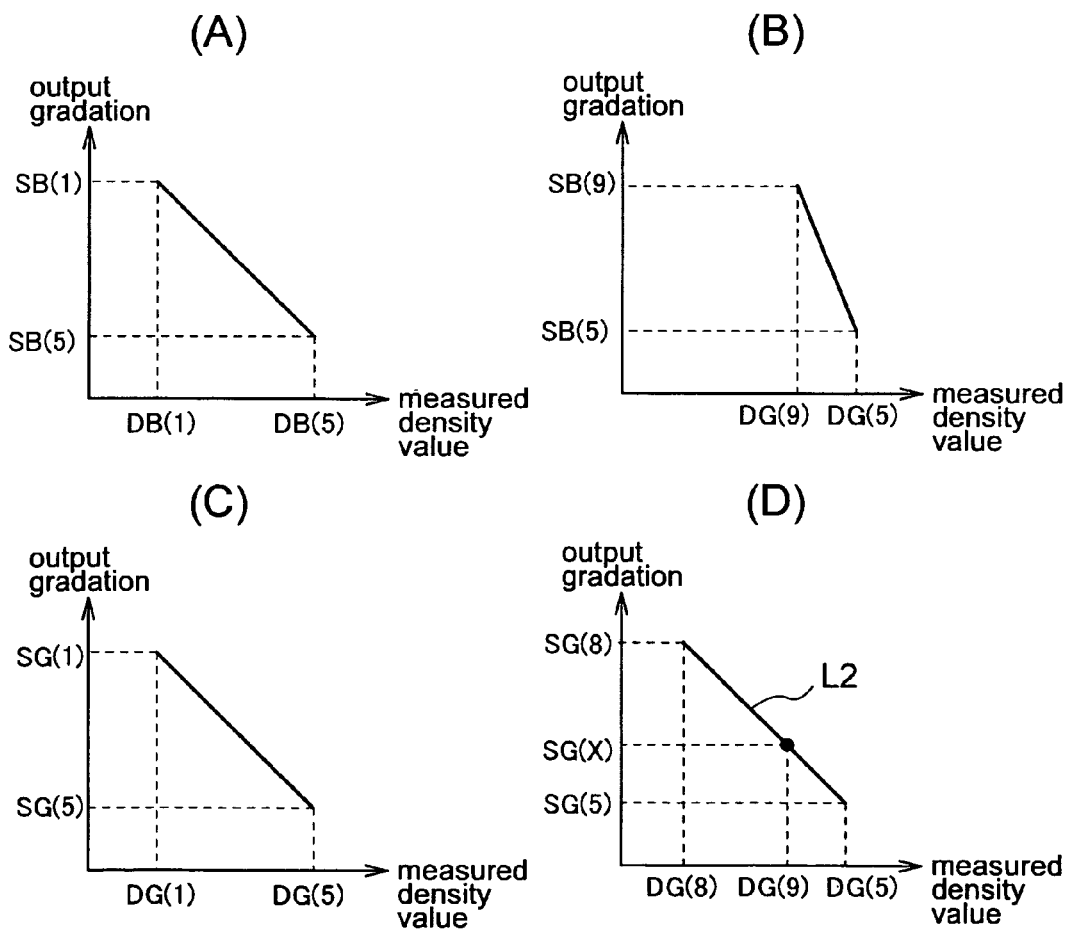
FIG. 7 is an explanatory diagram for describing how the improper coloring degree is calculated in accordance with an embodiment of the present invention.

It can be understood from the series of graphs shown in FIG. 7 that the correction factor: Bg (the change in the green density when only the amount of blue light has been changed) of the improper coloring degree for the blue light-emitting element 21 is found by normalizing the gradation value SG(x) for obtaining the same measured density value as the measured density value DG(9) on the gradation value-density value line. That is, the line L2 in FIG. 7D is obtained from the gradation value SG(8) for obtaining the measured density value DG(8) on the unbalanced chart and the gradation value SG(5) for obtaining DG(5) on the grayscale chart. Similarly, the correction factor: Rg (the change in the green density when only the amount of red light has been changed), the correction factor: Gb (the change in the blue density when only the amount of green light has been changed), the correction factor: Rb (the change in the blue density when only the amount of red light has been changed), the correction factor: Br (the change in the red density when only the amount of blue light has been changed) and the correction factor: Gr (the change in the red density when only the amount of green light has been changed), also can be found through the following equations.

$$Bg = \frac{\{DG(9)*a[G] + b[G]\}/SG(5) - 1}{SB(1)/SB(5)}$$

$$Br = \frac{\{DR(9)*a[R] + b[R]\}/SR(5) - 1}{SB(1)/SB(5)}$$

$$Gb = \frac{\{DB(8)*a[B] + b[B]\}/SB(5) - 1}{SG(1)/SB(5)}$$

$$Gr = \frac{\{DR(8)*a[R] + b[R]\}/SR(5) - 1}{SG(1)/SG(5)}$$

$$Rb = \frac{\{DB(7)*a[B] + b[B]\}/SB(5) - 1}{SR(1)/SR(5)}$$

$$Rg = \frac{\{DG(7)*a[G] + b[G]\}/SG(5) - 1}{SR(1)/SR(5)}$$

Consequently, a correction matrix for the improper coloring can be generated as follows.

$$\begin{bmatrix} 0 & Gb & Rb \\ Bg & 0 & Rg \\ Br & Gr & 0 \end{bmatrix}$$

The final correction matrix is generated by combining the above correction matrix for the primary coloring and the correction matrix for the improper coloring. In the following equation, the provisional luminance correction coefficients for the colors are a, b, and c, the final blue luminance correction coefficient is K_B, the final green luminance correction coefficient is K_G, and the final red luminance correction coefficient is K_R, and the final luminance correction values are calculated as follows.

$$\begin{bmatrix} K\_B \\ K\_G \\ K\_R \end{bmatrix} = \begin{bmatrix} Bb & -Gb & -Rb \\ -Bg & Gg & -Rg \\ -Br & -Gr & Rr \end{bmatrix} \begin{bmatrix} a-1 \\ b-1 \\ c-1 \end{bmatrix} + \begin{bmatrix} 1 \\ 1 \\ 1 \end{bmatrix}$$

It should be noted that in the above expression, the reason why one (1) is added to the value obtained by multiplying the correction matrix by the value obtained by subtracting one (1) from the provisional luminance correction coefficient for each color is because the provisional luminance correction coefficients and the luminance correction coefficients used are correction factors based on one (1). The correction matrix expresses a correction factor that further corrects the correction factor, and thus, for example if the value of the provisional luminance correction coefficient for each color is one (1) (no correction), then the final luminance correction coefficient also will be set to one (1).

Figure 8:
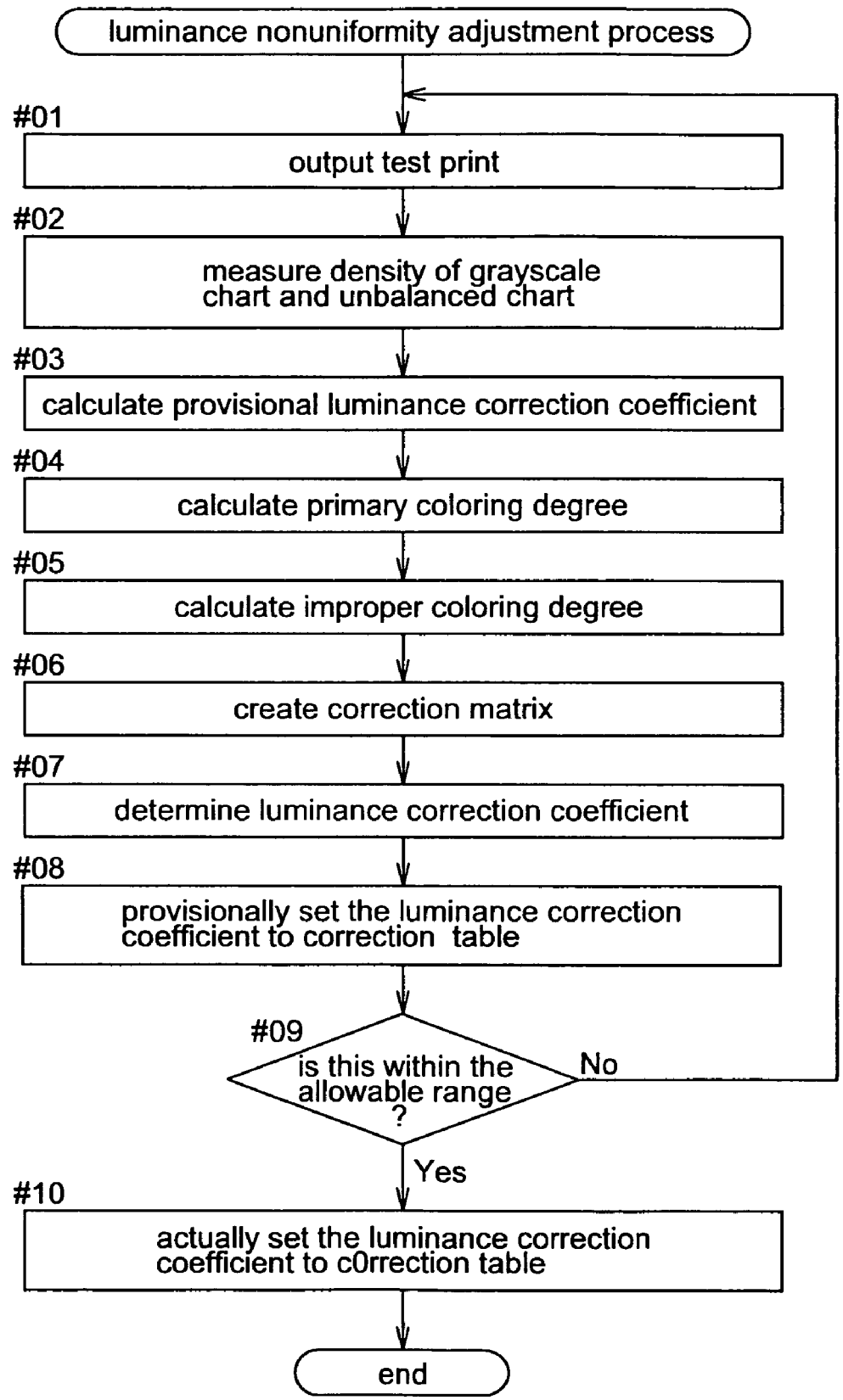
FIG. 8 is a flowchart that illustrates the processes of the luminance nonuniformity adjustment task in accordance with an embodiment of the present invention.

In accordance with an embodiment of the present invention, a typical flow of the luminance nonuniformity adjustment process of the digital laser printer is described using the flowchart of FIG. 8.

The image data for the test print are read from the test print data storage unit 41*a* of the test print output management unit 41. The gradation is corrected using luminance correction factors that are currently set in the correction coefficient table 48 of the gradation correction unit 44. The processed image data are converted into print data (an output signal) by the print data creation unit 35. The laser print head 20 is driven based on the output signal to expose the print paper P. The exposed print paper P is developed by the developing unit 15, dried, and then discharged onto the horizontal conveyor 16 as a test print TP that has a color chart and a grayscale chart in step 1.

The test print TP thus generated is placed in the flatbed scanner 4, which serves as a density meter. The patches of the grayscale chart and the unbalanced chart formed on the test print TP are measured. Based on the measured density values, the measured density preprocessing unit 42 determines the measured density value of the patches separately, and at that time the gradation value of the light-emitting element 21 that generated the exposure dot also is associated with each patch in step 2. In accordance with an embodiment of the present invention, the measured density values associated with the patches are as follows.

| | measured density | | |
|---|---|---|---|
| * | DB(*) | DG(*) | DR(*) |
| 0 | 60 | 51 | 58 |
| 1 | 69 | 59 | 65 |
| 2 | 85 | 72 | 78 |
| 3 | 106 | 91 | 97 |
| 4 | 130 | 114 | 118 |
| 5 | 149 | 134 | 137 |
| 6 | 165 | 148 | 151 |
| 7 | 144 | 119 | 72 |
| 8 | 136 | 71 | 123 |
| 9 | 74 | 124 | 137 |

Further, the gradation values associated with the patches are as follows.

| | measured gradation value | | |
|---|---|---|---|
| * | SB(*) | SG(*) | SR(*) |
| 0 | 1374 | 1251 | 1441 |
| 1 | 1223 | 1118 | 1307 |
| 2 | 1057 | 976 | 1160 |
| 3 | 891 | 828 | 1001 |
| 4 | 750 | 695 | 857 |
| 5 | 649 | 597 | 749 |
| 6 | 576 | 529 | 667 |
| 7 | 649 | 597 | 1307 |
| 8 | 649 | 1118 | 749 |
| 9 | 1223 | 597 | 749 |

The provisional luminance correction coefficient calculation unit 43 calculates the provisional luminance correction coefficients by comparing the target density value with the measured density value of the grayscale chart that is obtained by the measured density preprocessing unit 42 in step 3. Here, the calculated provisional luminance correction coefficients for the colors are (1.15, 1.30, and 1.10).

The primary coloring degree calculation unit 44 then, in the above order, determines the blue primary coloring degree correction factor: Bb, the green primary coloring degree correction factor: Gg and the red primary coloring degree correction factor: Rr from the primary coloring degrees in step 4. When the measured density values obtained in step 2 by the above expression and the gradation values are adopted, then $\alpha(B)=-7.65$, $\alpha(G)=-8.27$, $\alpha(R)=-8.58$; and $b(B)=1789$, $b(G)=1705$, and $b(R)=1925$, yielding Bb=1.03, Gg=1.09, and Rr=1.05. Consequently, in accordance with an embodiment of the present invention, the correction matrix for the primary coloring is a 3×3 matrix of [(1.03, 0, 0), (0, 1.09, 0), (0, 0, 1.05)].

The six improper coloring correction factors: Gb, Rb, Bg, Rg, Br, and Gr are determined by the improper coloring degree calculation unit 45 from the improper coloring degree in the above order in step 5. When the gradation values and measured density values obtained in step 2 through the above expression and the slope and the value of the intercept obtained in step 4 are adopted, then Gb=0.08, Rb=0.03, Bg=0.07, Rg=0.12, Br=0, and Gr=0.09. Consequently, in accordance with an embodiment of the present invention, the correction matrix for the improper coloring is a 3×3 matrix of [(0, 0.08, 0.03), (0.07, 0, 0.12), (0, 0.09, 0)].

The correction matrix creation unit 46 generates a correction matrix from the primary coloring correction matrix and the improper coloring correction matrix in step 6. In accordance with an embodiment of the present invention, the correction matrix is a 3×3 matrix of [(1.03, −0.08, −0.03), (−0.07, 1.09, −0.12), (0, −0.09, 1.05)].

Through the above equation, the luminance correction coefficient determination unit 47 determines the final blue luminance correction coefficient K_B, the final green luminance correction coefficient K_G, and the final red luminance correction coefficient K_R from the provisional luminance correction coefficients and the correction matrix in step 7. In accordance with an embodiment of the present invention, K_B=1.13, K_G=1.30, and K_R=1.08. These luminance correction coefficients are provisionally set in the correction coefficient table 48 in step 8.

It is determined whether or not the luminance correction coefficients ultimately determined are sufficiently converged values that are within a predetermined allowable range in step 9. If the condition in step 9 is not satisfied (No branch), then the steps 1-8 of the luminance nonuniformity adjustment process are repeated until the values of the luminance correction coefficients have been sufficiently converged. If the condition in step 9 is satisfied (Yes branch), then the luminance correction coefficients provisionally set in the correction coefficient table 48 are taken as the actual settings and luminance nonuniformity adjustment is ended in step 10.

The luminance nonuniformity adjustment technology of the present invention can be adopted in all image formation technology fields where it is necessary to take into account improper coloring in the calibration task of performing repeated test printings to find luminance correction coefficients to use when converting the gradation of the image data to the print data gradation.

We claim:

1. A luminance nonuniformity adjustment method for calculating a luminance correction coefficient for each optical element determined through a test print using a light-sensitive material to eliminate luminance nonuniformities in said optical elements of a color laser print head, which controls a plurality of said optical elements in a linear array for each color of the three basic colors according to an exposure gradation value based on an image data to expose the light-sensitive material, the method comprising the steps of:

calculating a provisional luminance correction coefficient by comparing a measured density value for a grayscale chart of areas having different density values and a predetermined target density value by a provisional luminance correction coefficient calculation unit of a luminance nonuniformity adjustment device;

calculating an improper coloring degree, which is the degree of improper coloring that occurs when other colors are expressed when developing a specific color, from a measured density value corresponding to the grayscale chart and an unbalanced chart where the gray balance has been altered by an improper coloring degree calculation unit of said luminance nonuniformity adjustment device;

correcting the provisional luminance correction coefficient using the calculated improper coloring degree to determined a final luminance correction coefficient by a luminance correction coefficient determination unit of said luminance nonuniformity adjustment device; and storing said final luminance correction coefficient in a correction table of said luminance nonuniformity adjustment device by said luminance correction coefficient determination unit of said luminance nonuniformity adjustment device.

2. The method of claim 1, further comprising the step of forming said grayscale chart and said unbalanced chart on a same test print by a test print output management unit of said luminance nonuniformity adjustment device.

3. The method of claim 1, further comprising the step of calculating a primary coloring degree, which is a degree of coloring of a specific color from said measured density values for said grayscale chart and said unbalanced chart by said improper coloring degree calculation unit of said luminance nonuniformity adjustment device; and correcting said provisional luminance correction coefficient using said calculated primary coloring degree and said improper coloring degree by said luminance correction coefficient determination unit of said luminance nonuniformity adjustment device.

4. The method of claim 3, further comprising the step of expressing said final luminance correction coefficient determined by said luminance correction coefficient determination unit of said luminance nonuniformity adjustment device in a matrix equation by a correction matrix creation unit of said luminance nonuniformity adjustment device:

$$\begin{bmatrix} K\_B \\ K\_G \\ K\_R \end{bmatrix} = \begin{bmatrix} Bb & -Gb & -Rb \\ -Bg & Gg & -Rg \\ -Br & -Gr & Rr \end{bmatrix} \begin{bmatrix} a-1 \\ b-1 \\ c-1 \end{bmatrix} + \begin{bmatrix} 1 \\ 1 \\ 1 \end{bmatrix}$$

where K_B is a blue luminance correction coefficient K_G is a green luminance correction coefficient, K_R is a red luminance correction coefficient, Bb is a primary coloring degree of blue with respect to a blue exposure gradation value, Gg is a primary coloring degree of green with respect to a green exposure gradation value, Rr is a primary coloring degree of red with respect to a red exposure gradation value, Gb is an improper coloring degree of blue with respect to the green exposure gradation value, Rb is an improper coloring degree of blue with respect to the red exposure gradation value, Bg is an improper coloring degree of green with respect to the blue exposure gradation value, Rg is an improper coloring degree of green with respect to the red exposure gradation value, Br is an improper coloring degree of red with respect to the blue exposure gradation value, Gr is an improper coloring degree of red with respect to the green exposure gradation value, a is the provisional luminance correction coefficient for blue, b is the provisional luminance correction coefficient for green and c is the provisional luminance correction coefficient for red.

5. A luminance nonuniformity adjustment device for calculating a luminance correction coefficient for each optical element determined through a test print using a light-sensitive material to eliminate luminance nonuniformities in said optical elements in a color laser print head, which controls a plurality of said optical elements in a linear array for each color of the three basic colors according to an exposure gradation value based on an image data to expose the light-sensitive material, said luminance nonuniformity adjustment device comprising:

a provisional luminance correction coefficient calculation unit for calculating a provisional luminance correction coefficient by comparing a measured density value for a grayscale chart of areas having different density values and a predetermined target density value;

an improper coloring degree calculation unit for calculating an improper coloring degree, which is the degree of improper coloring that occurs when other colors are expressed when developing a specific color, from measured density values for the grayscale chart and an unbalanced chart where the gray balance has been altered; and a luminance correction coefficient determination unit for determining a final luminance correction coefficient by correcting the provisional luminance correction coefficient using said calculated improper coloring degree, and storing said final luminance correction coefficient for said each optical element in a correction table of said luminance nonuniformity adjustment device.

6. The luminance nonuniformity adjustment device of claim 5, further comprising a primary coloring degree calculation unit for calculating a primary coloring degree, which is a degree of expression of a specific color, from the measured density values corresponding to said grayscale chart and said unbalanced chart; and wherein said luminance correction coefficient determination unit determines a final luminance correction coefficient from said provisional luminance correction coefficient using said primary coloring degree and said improper coloring degree.

7. The luminance nonuniformity adjustment device of claim 6, further comprising a correction matrix creation unit for generating a 3×3 correction matrix whose elements are a primary coloring degree Bb of blue with respect to a blue exposure gradation value, a primary coloring degree Gg of green with respect to a green exposure gradation value, a primary coloring degree Rr of red with respect to a red exposure gradation value, an improper coloring degree Gb of blue with respect to the green exposure gradation value, an improper coloring degree Rb of blue with respect to the red exposure gradation value, an improper coloring degree Bg of green with respect to the blue exposure gradation value, an improper coloring degree Rg of green with respect to the red exposure gradation value, an improper coloring degree Br of red with respect to the blue exposure gradation value and an improper coloring degree Gr of red with respect to the green exposure gradation value based on the calculated values from said primary coloring degree calculation unit and said improper coloring degree calculation unit; and wherein said luminance correction coefficient determination unit determines said final luminance correction coefficients by multiplying the blue, green, and red provisional luminance correction coefficients by said correction matrix.

8. An image forming device incorporating the luminance nonuniformity adjustment device of claim 5.

9. The image forming device of claim 8 being a digital laser printer.

* * * * *